US011927205B2

(12) United States Patent
Hishinuma et al.

(10) Patent No.: US 11,927,205 B2
(45) Date of Patent: Mar. 12, 2024

(54) HYDRAULIC SYSTEM

(71) Applicant: Komatsu Ltd., Tokyo (JP)

(72) Inventors: Yuichi Hishinuma, Tokyo (JP); Shinobu Nagura, Tokyo (JP)

(73) Assignee: Komatsu Ltd., Tokyo (JP)

( * ) Notice: Subject to any disclaimer, the term of this patent is extended or adjusted under 35 U.S.C. 154(b) by 46 days.

(21) Appl. No.: 17/796,438

(22) PCT Filed: Feb. 19, 2021

(86) PCT No.: PCT/JP2021/006408
§ 371 (c)(1),
(2) Date: Jul. 29, 2022

(87) PCT Pub. No.: WO2021/187007
PCT Pub. Date: Sep. 23, 2021

(65) Prior Publication Data
US 2023/0113111 A1 Apr. 13, 2023

(30) Foreign Application Priority Data
Mar. 17, 2020 (JP) ................................ 2020-046402

(51) Int. Cl.
*F15B 11/024* (2006.01)
*E02F 9/22* (2006.01)
*F15B 11/17* (2006.01)

(52) U.S. Cl.
CPC .......... *F15B 11/024* (2013.01); *E02F 9/2239* (2013.01); *E02F 9/2242* (2013.01);
(Continued)

(58) Field of Classification Search
CPC ....... F15B 11/024; F15B 11/166; F15B 11/17; F15B 21/14; E02F 9/2217; E02F 9/2239;
(Continued)

(56) References Cited

U.S. PATENT DOCUMENTS 7,127,887 B2 * 10/2006 Nakamura ............ F15B 21/087 60/494
7,562,615 B2 * 7/2009 Abe ...................... E02F 9/2296 91/445
(Continued)

FOREIGN PATENT DOCUMENTS

JP 2001-304202 A 10/2001
JP 2011-220356 A 11/2011
(Continued)

*Primary Examiner* — Michael Leslie
(74) *Attorney, Agent, or Firm* — Locke Lord LLP

(57) ABSTRACT

A hydraulic system includes: an arm hydraulic cylinder; a first hydraulic pump and a second hydraulic pump; an arm first direction switching valve; an arm second direction switching valve; and a controller that controls an operation of the arm second direction switching valve when the arm hydraulic cylinder is extended and operated. Further, the arm first direction switching valve incorporates an arm regeneration passage capable of supplying oil when the arm hydraulic cylinder is extended and operated, and the controller monitors a pressure state of the arm hydraulic cylinder, and when determining that oil flow through the arm regeneration passage is possible, the controller blocks oil flow between the arm hydraulic cylinder and the arm second direction switching valve, and otherwise, the controller operates the arm second direction switching valve so that oil can be supplied from the second hydraulic pump to the bottom chamber.

8 Claims, 11 Drawing Sheets

(52) U.S. Cl.
CPC .......... *E02F 9/2285* (2013.01); *E02F 9/2292* (2013.01); *E02F 9/2296* (2013.01); *F15B 11/17* (2013.01); *E02F 9/2217* (2013.01); *E02F 9/2282* (2013.01); *F15B 2201/51* (2013.01); *F15B 2211/20546* (2013.01); *F15B 2211/20576* (2013.01); *F15B 2211/3056* (2013.01); *F15B 2211/3133* (2013.01); *F15B 2211/355* (2013.01); *F15B 2211/6313* (2013.01); *F15B 2211/6355* (2013.01)

(58) Field of Classification Search
CPC ..... E02F 9/2242; E02F 9/2282; E02F 9/2285; E02F 9/2292; E02F 9/2296
See application file for complete search history.

(56) References Cited

U.S. PATENT DOCUMENTS

| | | | | |
|---|---|---|---|---|
| 11,162,245 | B2 | 11/2021 | Nakajima | |
| 11,566,640 | B2 * | 1/2023 | Nakajima | F15B 11/024 |
| 11,585,068 | B2 * | 2/2023 | Nakajima | E02F 3/435 |
| 2021/0123213 | A1 | 4/2021 | Maekawa et al. | |

FOREIGN PATENT DOCUMENTS

| | | | |
|---|---|---|---|
| JP | 2014-163426 | A | 9/2014 |
| JP | 2017-201072 | A | 11/2017 |
| JP | 2019-002531 | A | 1/2019 |
| WO | 2019/220872 | A1 | 11/2019 |

* cited by examiner

ARM DUMPING

FIG. 10 BOOM LOWERING: REGENERATION POSSIBLE + ARM DUMPING

HYDRAULIC SYSTEM

FIELD

The present disclosure relates to a hydraulic system.

BACKGROUND

This type of hydraulic system has already been provided in which oil discharged from a rod chamber is supplied (regenerated) to a bottom chamber on condition that a pressure in the rod chamber of an arm hydraulic cylinder exceeds a pressure in the bottom chamber, when the arm hydraulic cylinder is extended and operated, for example, when an arm provided at a distal end of a boom is operated so as to approach a base of a work machine from a horizontal state (an excavating operation of the arm). According to this hydraulic system, since a flow rate of the oil supplied from a hydraulic pump to the bottom chamber can be reduced, a discharge flow rate from the hydraulic pump can be reduced, and there is an advantage that fuel efficiency can be improved (See, for example, Patent Literature 1.).

CITATION LIST

Patent Literature

Patent Literature 1: Japanese Laid-open Patent Publication No. 2019-2531 (FIGS. 5 and 6)

SUMMARY

Technical Problem

Meanwhile, in a work machine, in order to increase an operation speed of the arm, oil is supplied from two hydraulic pumps to an arm hydraulic cylinder. That is, a first direction switching valve is provided between a first hydraulic pump and the arm hydraulic cylinder, and a second direction switching valve is provided between a second hydraulic pump and the arm hydraulic cylinder. In this hydraulic system, if the respective hydraulic pumps and the arm hydraulic cylinder are connected by the two direction switching valves, a flow rate of the oil supplied to the arm hydraulic cylinder per unit time increases, so that the operation speed of the arm can be increased.

On the other hand, during oil regeneration in the excavating operation of the arm described above, controllability of the arm is more important than the high operation speed. That is, it is necessary to accurately control the flow rate of the oil supplied to the arm hydraulic cylinder or the flow rate of the oil discharged from the arm hydraulic cylinder according to the operation of an operation lever. In response to such a demand, in the related-art hydraulic system that supplies oil to the arm hydraulic cylinder via the two direction switching valves, not only high dimensional accuracy is required for processing of each of the direction switching valves, but also it is necessary to eliminate variations due to the combination of the two direction switching valves, and there is a possibility that the manufacturing work and the assembly work become significantly complicated.

In view of the above circumstances, an object of the present disclosure is to provide a hydraulic system capable of facilitating manufacturing work and assembly work.

In view of the above circumstances, an object of the present invention is to provide a hydraulic system capable of facilitating manufacturing work and assembly work.

Solution to Problem

To attain the object, a hydraulic system includes: an arm hydraulic cylinder supported by a boom of a work machine via a cylinder body, and supported by an arm of the work machine via a rod; a first hydraulic pump and a second hydraulic pump; an arm first direction switching valve interposed between the first hydraulic pump and the arm hydraulic cylinder; an arm second direction switching valve interposed between the second hydraulic pump and the arm hydraulic cylinder; and a controller that controls an operation of the arm second direction switching valve when the arm hydraulic cylinder is extended and operated. Further, the arm first direction switching valve incorporates an arm regeneration passage capable of supplying oil discharged from a rod chamber of the arm hydraulic cylinder to a bottom chamber of the arm hydraulic cylinder when the arm hydraulic cylinder is extended and operated, and the controller monitors a pressure state of the arm hydraulic cylinder, and when determining that oil flow through the arm regeneration passage is possible, the controller blocks oil flow between the arm hydraulic cylinder and the arm second direction switching valve, and when determining that oil flow through the arm regeneration passage is not possible, the controller operates the arm second direction switching valve so that oil can be supplied from the second hydraulic pump to the bottom chamber.

Advantageous Effects of Invention

According to the present disclosure, since oil does not flow through the arm second direction switching valve during oil regeneration, in other words, oil flows to the arm hydraulic cylinder only through the arm first direction switching valve, there is no need to consider variations due to the combination of the arm first direction switching valve and the arm second direction switching valve, and it is possible to facilitate manufacturing work and assembly work.

DESCRIPTION OF EMBODIMENTS

Hereinafter, a preferred embodiment of a hydraulic system according to the present disclosure will be described in detail with reference to the accompanying drawings.

Figure 1:
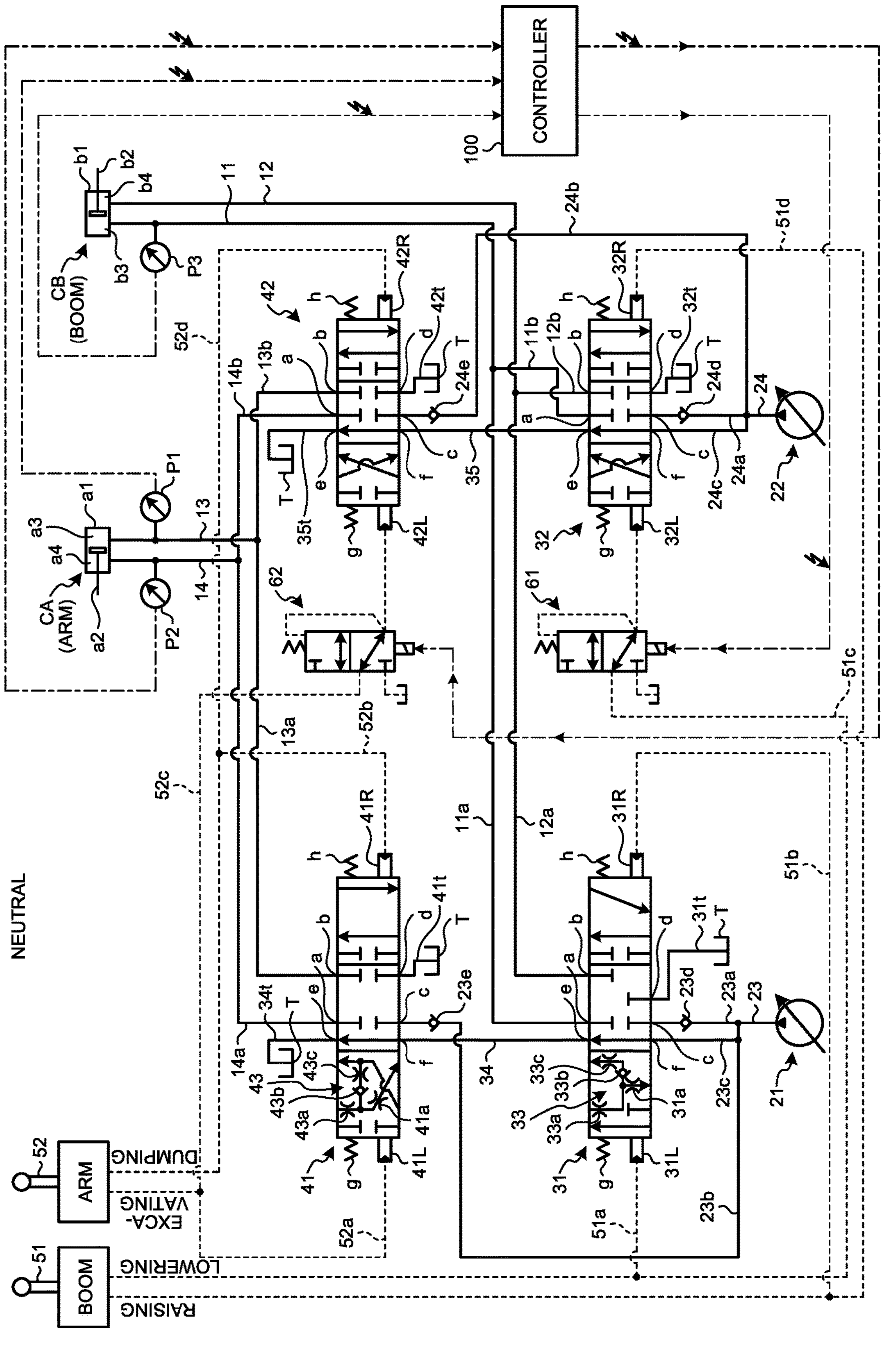
FIG. 1 is a diagram illustrating a state in which a boom first direction switching valve, a boom second direction switching valve, an arm first direction switching valve, and an arm second direction switching valve are disposed at neutral positions in a hydraulic system according to an embodiment of the present disclosure.

FIG. 1 illustrates a hydraulic system according to an embodiment of the present disclosure. The hydraulic system exemplified here is for operating a boom hydraulic cylinder CB and an arm hydraulic cylinder CA of a work machine illustrated in FIG. 2. The boom hydraulic cylinder CB and the arm hydraulic cylinder CA are of a single-rod double-acting type including single pistons PB and PA, respectively. In the work machine, an upper swing body (base body) 2 is disposed in an upper part of a lower travelling body 1 so as to be rotatable about a swing axis along a vertical direction, and a boom 3 and an arm 4 are provided in the upper swing body 2. The boom 3 is rotatably supported by the upper swing body 2 via a base end part by a boom support shaft 5 along a horizontal direction. The arm 4 is rotatably supported by a distal end part of the boom 3 via a proximal end part by an arm support shaft 6 along the horizontal direction.

(Boom Hydraulic Cylinder CB)

The boom hydraulic cylinder CB is supported by the upper swing body 2 via a cylinder body b1 and supported by the boom 3 via a rod b2. When the boom hydraulic cylinder CB performs an extending operation, the distal end part of the boom 3 moves upward with respect to the upper swing body 2 (boom raising), and when the boom hydraulic cylinder CB performs a retracting operation, the distal end part of the boom 3 moves downward with respect to the upper swing body 2 (boom lowering). As illustrated in FIG. 1, in the boom hydraulic cylinder CB, a boom bottom oil passage 11 is connected to a bottom chamber b3, and a boom rod oil passage 12 is connected to a rod chamber b4. The boom bottom oil passage 11 is bifurcated halfway into a boom first bottom oil passage 11*a* and a boom second bottom oil passage 11*b*. Similarly, the boom rod oil passage 12 is bifurcated halfway into a boom first rod oil passage 12*a* and a boom second rod oil passage 12*b*.

(Arm Hydraulic Cylinder CA)

Figure 2:
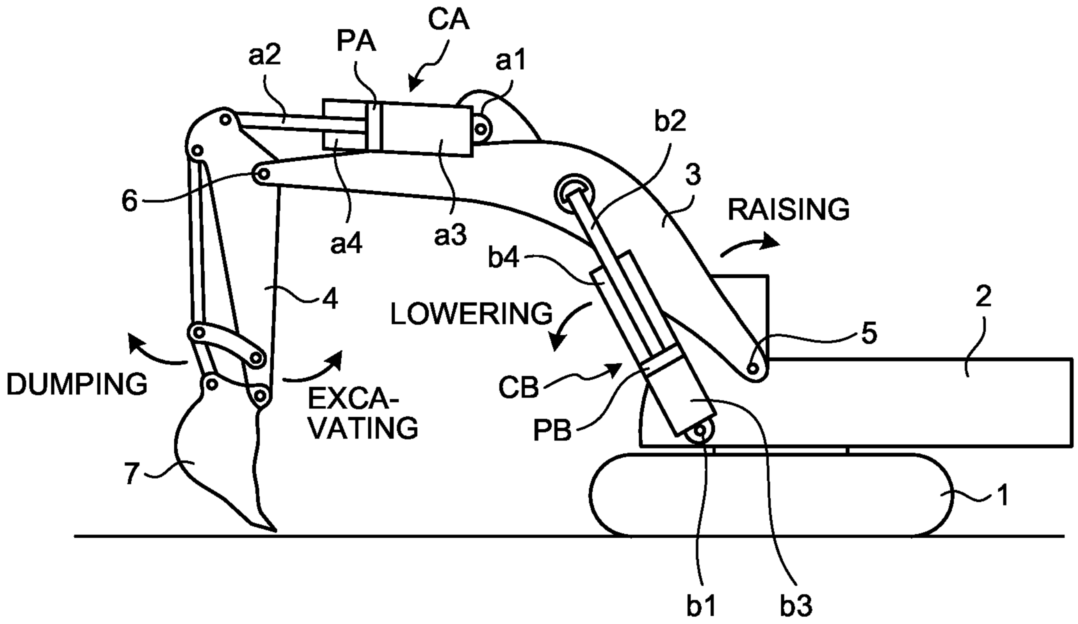
FIG. 2 is a side view conceptually illustrating a work machine to which the hydraulic system illustrated in FIG. 1 is applied.

As illustrated in FIG. 2, the arm hydraulic cylinder CA is supported by the boom 3 via a cylinder body a1 and is supported by the arm 4 via a rod a2. When the arm hydraulic cylinder CA performs the extending operation, the distal end part of the arm 4 moves so as to approach the upper swing body 2 (arm excavation), and when the arm hydraulic cylinder CA performs the retracting operation, the distal end part of the arm 4 moves so as to be separated from the upper swing body 2 (arm dump). As illustrated in FIG. 1, in the arm hydraulic cylinder CA, an arm bottom oil passage 13 is connected to a bottom chamber a3, and an arm rod oil passage 14 is connected to a rod chamber a4. The arm bottom oil passage 13 is bifurcated into an arm first bottom oil passage 13*a* and an arm second bottom oil passage 13*b* in the middle. Similarly, the arm rod oil passage 14 is bifurcated into an arm first rod oil passage 14*a* and an arm second rod oil passage 14*b* in the middle.

(Hydraulic System)

The hydraulic system includes two hydraulic pumps 21 and 22, a boom first direction switching valve 31 and a boom second direction switching valve 32 for operating the boom hydraulic cylinder CB, and an arm first direction switching valve 41 and an arm second direction switching valve 42 for operating the arm hydraulic cylinder CA.

(Hydraulic Pumps 21 and 22)

Each of the two hydraulic pumps 21 and 22 is of a variable capacity type driven by an engine (not illustrated). In the present embodiment, the two hydraulic pumps 21 and 22 having the same maximum discharge flow rate are applied, but it is a matter of course that hydraulic pumps having different maximum discharge flow rates may be applied. Hereinafter, for convenience, when the two hydraulic pumps 21 and 22 are distinguished, one is referred to as a first hydraulic pump 21 and the other is referred to as a second hydraulic pump 22. Pump oil passages 23 and 24 are connected to discharge ports of the respective hydraulic pumps 21 and 22. The first pump oil passage 23 connected to the discharge port of the first hydraulic pump 21 is branched into three passages, that is, a first pump oil passage 23*a* for a boom, an arm first pump oil passage 23*b*, and a first pump oil passage 23*c* for opening on the way. The boom first pump oil passage 23*a* is provided with a check valve 23*d*, and the arm first pump oil passage 23*b* is provided with a check valve 23*e*. Similarly, the second pump oil passage 24 connected to the discharge port of the second hydraulic pump 22 is branched into three passages, that is, a boom second pump oil passage 24*a*, an arm second pump oil passage 24*b*, and a second pump oil passage 24*c* for opening on the way. Check valves 24*d* and 24*e* are provided in the boom second pump oil passage 24*a* and the arm second pump oil passage 24*b*, respectively.

(Boom Direction Switching Valves 31 and 32)

In the boom first direction switching valve 31 and the boom second direction switching valve 32, spools individually operate by a pilot pressure output according to an operation of a common boom operation lever 51. The boom operation lever 51 is configured to output a pilot pressure of a pressure corresponding to an operation amount.

(Boom First Direction Switching Valve 31)

The boom first direction switching valve 31 is configured to selectively switch a connection state of a pump port c and a drain port d with respect to a first input/output port a and a second input/output port b by the operation of the spool, switch a disconnection state of a boom regeneration passage

33 built in the spool, and further switch a connection state of an open port f with respect to a communication port e.

More specifically, when the boom operation lever 51 is in a neutral state, the pilot pressure does not act on left and right pressure chambers 31L and 31R, so that the boom first direction switching valve 31 is maintained at the neutral position illustrated in FIG. 1 by left and right springs g and h. In a state where the boom first direction switching valve 31 is disposed at a neutral position, the two input/output ports a and b, the pump port c, and the drain port d are blocked, respectively, and the communication port e is connected to the open port f.

Figure 3:
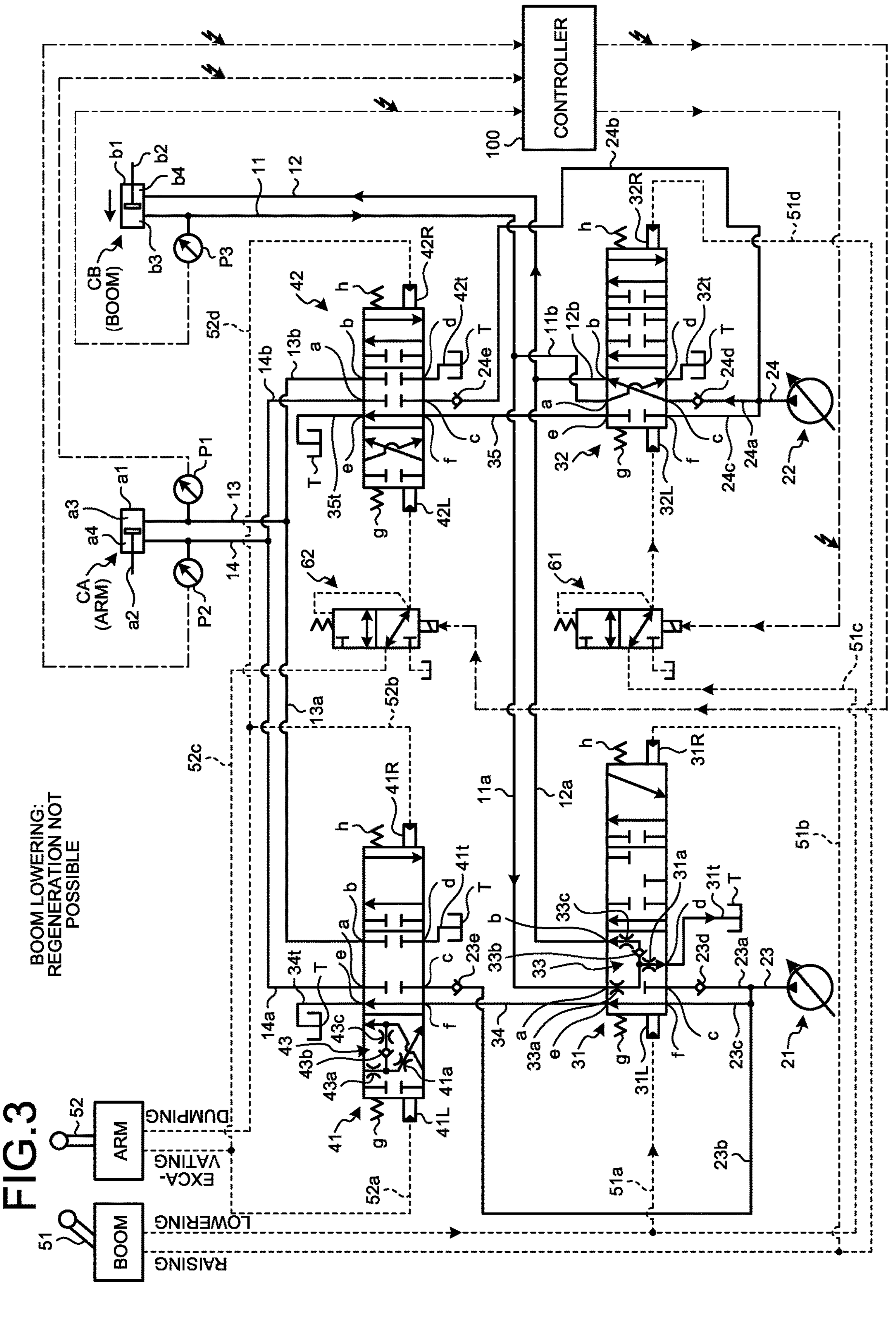
FIG. 3 is a diagram illustrating a state in which the boom first direction switching valve and the boom second direction switching valve are disposed at lowered positions and the arm first direction switching valve and the arm second direction switching valve are disposed at neutral positions in the hydraulic system illustrated in FIG. 1.

When the pilot pressure acts on the pressure chamber 31L provided on the left side of the spool through a boom lowering first pilot oil passage 51*a* by a lowering operation of the boom operation lever 51, the spool moves to the right side and moves to the lowered position illustrated in FIG. 3. In the boom first direction switching valve 31 disposed at the lowered position, the pump port c is in a blocked state, and the first input/output port a is connected to the drain port d via a first throttle 33*a* and a second throttle 31*a*. Further, in the boom first direction switching valve 31 disposed at the lowered position, the boom regeneration passage 33 is in a communicating state. The boom regeneration passage 33 reaches the second input/output port b from the first input/output port a via the first throttle 33*a*, a check valve 33*b*, and a third throttle 33*c*, and allows only passage of oil from the first input/output port a to the second input/output port b. Note that the boom first direction switching valve 31 disposed at the lowered position maintains a state in which the communication port e is connected to the open port f.

Figure 4:
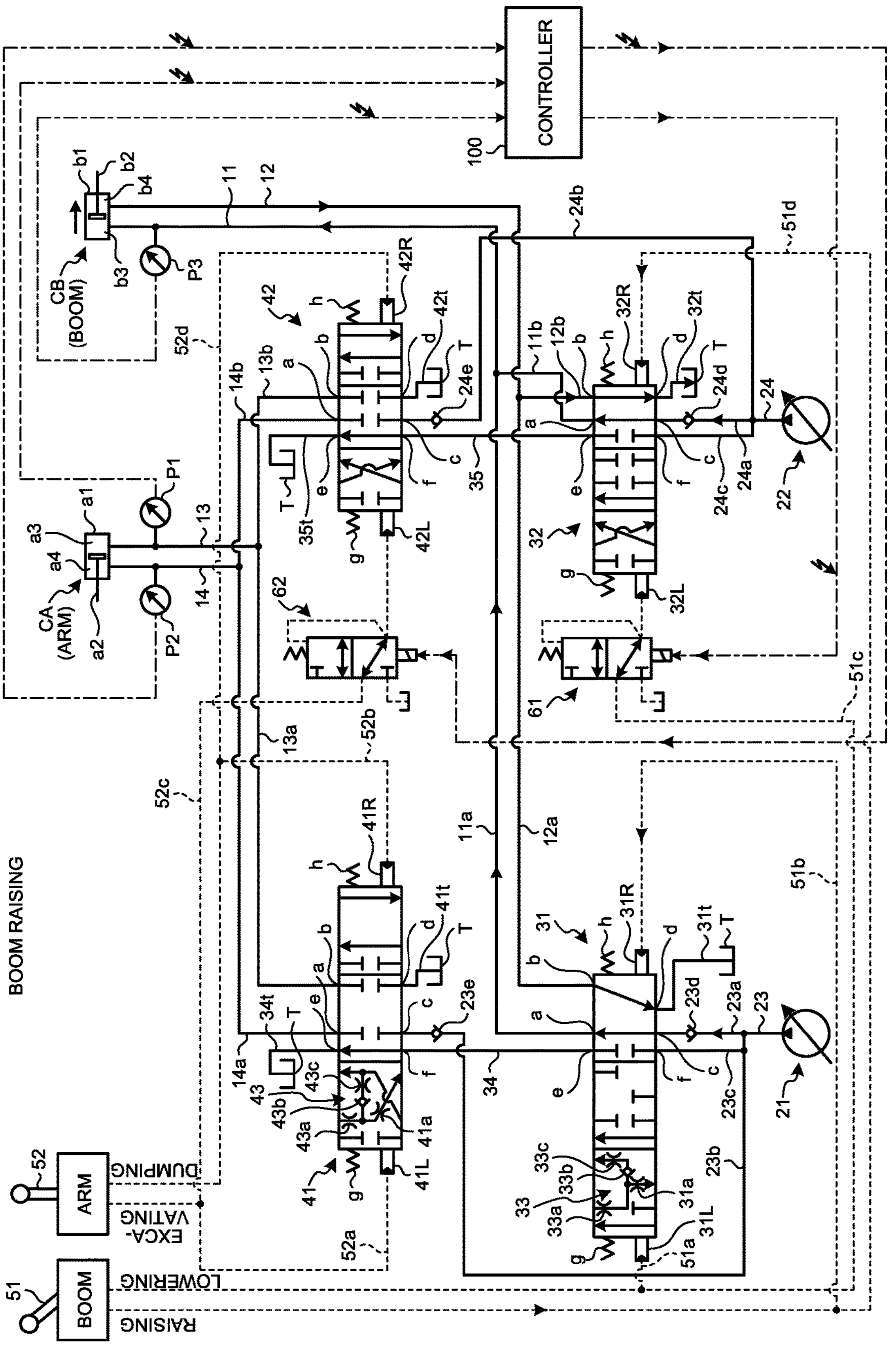
FIG. 4 is a diagram illustrating a state in which the boom first direction switching valve and the boom second direction switching valve are disposed at raised positions and the arm first direction switching valve and the arm second direction switching valve are disposed at neutral positions in the hydraulic system illustrated in FIG. 1.

On the other hand, when the pilot pressure acts on a pressure chamber 31R provided on the right side of the spool through a boom raising first pilot oil passage 51*b* by a raising operation of the boom operation lever 51, the spool moves to the left side and moves to a raised position illustrated in FIG. 4. In the boom first direction switching valve 31 disposed at the raised position, the first input/output port a is connected to the pump port c, and the second input/output port b is connected to the drain port d. Note that in the boom first direction switching valve 31 disposed at the raised position, the communication port e and the opening port f are switched to a disconnected state.

As illustrated in FIG. 1, in the boom first direction switching valve 31, the boom first bottom oil passage 11*a* is connected to the first input/output port a, and the boom first rod oil passage 12*a* is connected to the second input/output port b. The boom first pump oil passage 23*a* is connected to the pump port c, and a boom first tank oil passage 31*t* leading to a tank T is connected to the drain port d. Further, the opening first pump oil passage 23*c* is connected to the opening port f, and a first communication oil passage 34 is connected to the communication port e.

(Boom Second Direction Switching Valve 32)

The boom second direction switching valve 32 is configured to selectively switch a connection state of the pump port c and the drain port d with respect to the first input/output port a and the second input/output port b, and switch a connection state of the open port f with respect to the communication port e by an operation of the spool.

More specifically, when the boom operation lever 51 is in the neutral state, the pilot pressure does not act on the left and right pressure chambers 32L and 32R, so that the boom second direction switching valve 32 is maintained at the neutral position illustrated in FIG. 1 by the springs g and h. In a state where the boom second direction switching valve 32 is disposed at the neutral position, the two input/output ports a and b, the pump port c, and the drain port d are blocked, respectively, and the communication port e is connected to the open port f.

When pilot pressure acts on the pressure chamber 32L provided on the left side of the spool through a boom lowering second pilot oil passage 51*c* and a boom pressure reducing valve 61 to be described later by the lowering operation of the boom operation lever 51, the spool moves to the right side and is disposed at the lowered position illustrated in FIG. 3. In the boom second direction switching valve 32 disposed at the lowered position, the first input/output port a is connected to the drain port d, and the second input/output port b is connected to the pump port c. Note that in the boom second direction switching valve 32 disposed at the lowered position, the communication port e and the opening port f are switched to the disconnected state.

On the other hand, when the pilot pressure acts on the pressure chamber 32R provided on the right side of the spool through a boom raising second pilot oil passage 51*d* by the raising operation of the boom operation lever 51, the spool moves to the left side and moves to the raised position illustrated in FIG. 4. In the boom second direction switching valve 32 disposed at the raised position, the first input/output port a is connected to the pump port c, and the second input/output port b is connected to the drain port d. Note that in the boom second direction switching valve 32 disposed at the raised position, the communication port e and the opening port f are switched to the disconnected state.

As illustrated in FIG. 1, in the boom second direction switching valve 32, the boom second bottom oil passage 11*b* is connected to the first input/output port a, and the boom second rod oil passage 12*b* is connected to the second input/output port b. The boom second pump oil passage 24*a* is connected to the pump port c, and a boom second tank oil passage 32*t* leading to the tank T is connected to the drain port d. Further, the opening second pump oil passage 24*c* is connected to the opening port f of the boom second direction switching valve 32, and a second communication oil passage 35 is connected to the communication port e.

As is apparent from the drawing, the boom pressure reducing valve 61 is provided in the boom lowering second pilot oil passage 51*c* extending from the boom operation lever 51 to the pressure chamber 32L provided on the left side of the boom second direction switching valve 32. When a control signal is not output from a controller 100 to be described later, the boom pressure reducing valve 61 cuts off the pilot pressure from the boom lowering second pilot oil passage 51*c* to the pressure chamber 32L, and connects the pressure chamber 32L to the tank, and when the control signal is output from the controller 100, supplies the pilot pressure output from the boom operation lever 51 to the pressure chamber 32L. The pilot pressure supplied to the pressure chamber 32L may be reduced by the boom pressure reducing valve 61.

(Arm Direction Switching Valves 41 and 42)

In the arm first direction switching valve 41 and the arm second direction switching valve 42, the spools individually operate by the pilot pressure output according to an operation of a common arm operation lever 52. The arm operation lever 52 is configured to output a pilot pressure of a pressure corresponding to an operation amount.

(Arm First Direction Switching Valve 41)

The arm first direction switching valve 41 is configured to selectively switch a connection state of the pump port c and the drain port d with respect to the first input/output port a and the second input/output port b by an operation of the spool, switch a disconnection state of an arm regeneration passage 43 built in the spool, and further switch a connection state of the open port f with respect to the communication port e.

More specifically, when the arm operation lever 52 is in a neutral state, the pilot pressure does not act on left and right pressure chambers 41L and 41R, and thus the arm first direction switching valve 41 is maintained at the neutral position illustrated in FIG. 1 by the springs g and h. In a state where the arm first direction switching valve 41 is disposed at the neutral position, the two input/output ports a and b, the pump port c, and the drain port d are blocked, respectively, and the communication port e is connected to the open port f.

Figure 5:
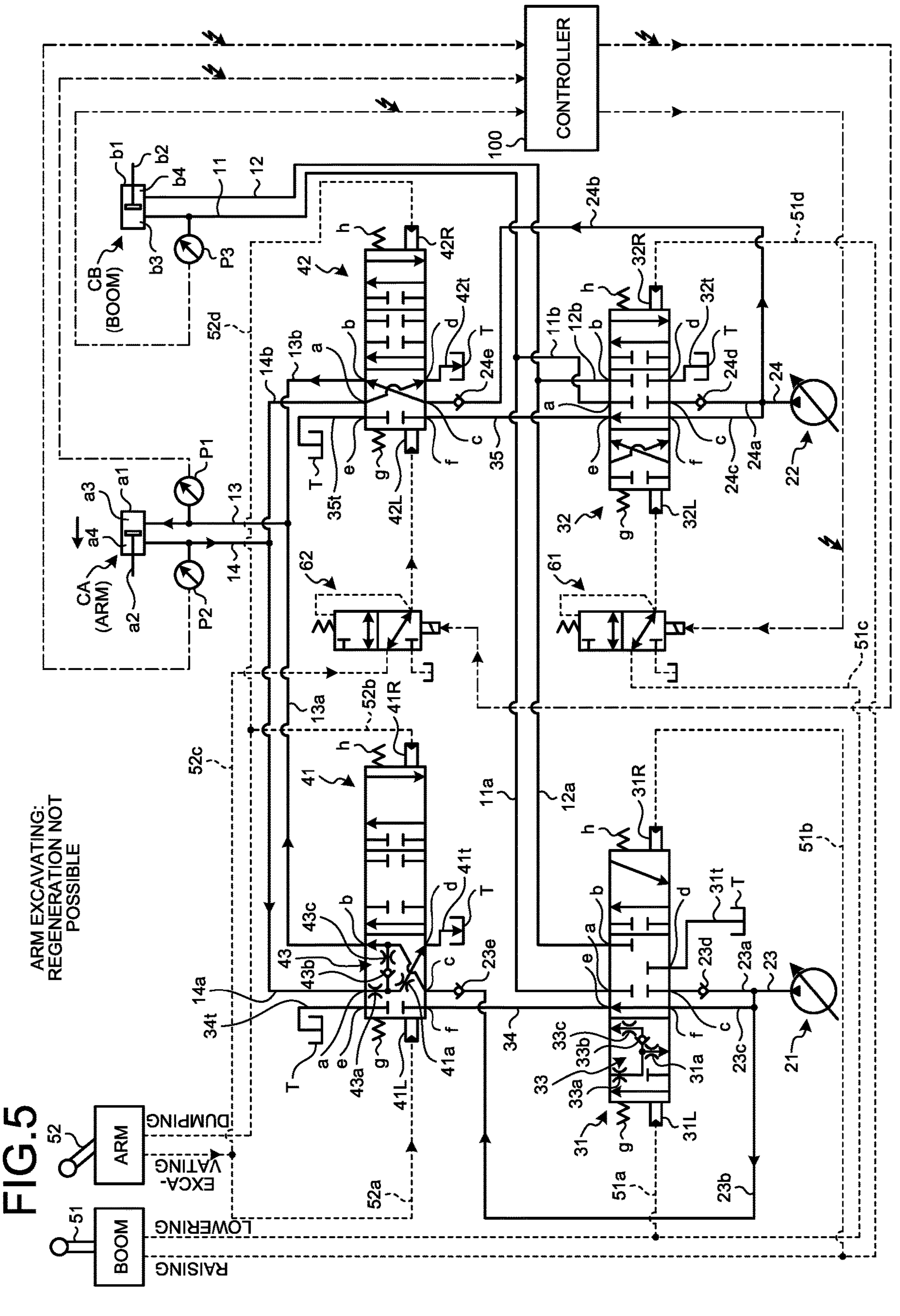
FIG. 5 is a diagram illustrating a state in which the arm first direction switching valve and the arm second direction switching valve are disposed at excavating positions and the boom first direction switching valve and the boom second direction switching valve are disposed at neutral positions in the hydraulic system illustrated in FIG. 1.

When the pilot pressure acts on the pressure chamber 41L provided on the left side of the spool through an arm excavation first pilot oil passage 52*a* by an excavating operation of the arm operation lever 52, the spool moves to the right side and moves to an excavating position illustrated in FIG. 5. In the arm first direction switching valve 41 disposed at the excavating position, the first input/output port a is connected to the drain port d via a first throttle 43*a* and a second throttle 41*a*, and the second input/output port b is connected to the pump port c. Further, in the arm first direction switching valve 41 disposed at the excavating position, the arm regeneration passage 43 is in a communicating state. The arm regeneration passage 43 reaches the second input/output port b from the first input/output port a via the first throttle 43*a*, a check valve 43*b*, and a third throttle 43*c*, and allows only passage of oil from the first input/output port a to the second input/output port b. Note that in the arm first direction switching valve 41 disposed at the excavating position, the communication port e and the open port f are switched to the disconnected state.

Figure 6:
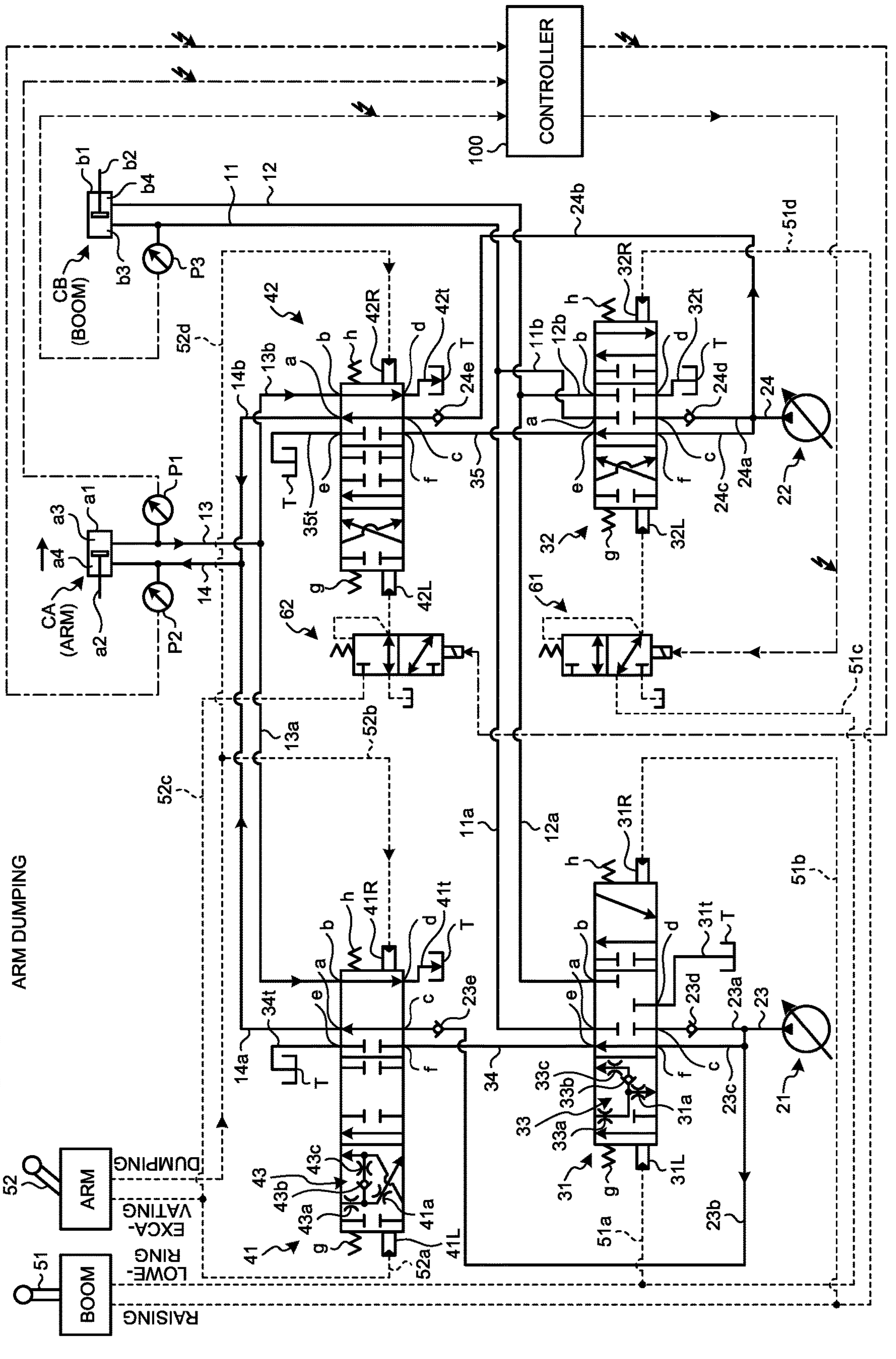
FIG. 6 is a diagram illustrating a state in which the arm first direction switching valve and the arm second direction switching valve are disposed at dumping positions and the boom first direction switching valve and the boom second direction switching valve are disposed at neutral positions in the hydraulic system illustrated in FIG. 1.

On the other hand, when the pilot pressure acts on the pressure chamber 41R provided on the right side of the spool through an arm dump first pilot oil passage 52*b* by a dumping operation of the arm operation lever 52, the spool moves to the left side and moves to a dumping position illustrated in FIG. 6. In the arm first direction switching valve 41 disposed at the dumping position, the first input/output port a is connected to the pump port c, and the second input/output port b is connected to the drain port d. Further, in the arm first direction switching valve 41 disposed at the dumping position, the arm regeneration passage 43 is in a blocked state, and oil is not circulated between the first input/output port a and the second input/output port b. Note that in the arm first direction switching valve 41 disposed at the dumping position, the communication port e and the open port f are switched to a disconnected state.

As illustrated in FIG. 1, in the arm first direction switching valve 41, the arm first rod oil passage 14*a* is connected to the first input/output port a, and the arm first bottom oil passage 13*a* is connected to the second input/output port b. The arm first pump oil passage 23*b* is connected to the pump port c, and an arm first tank oil passage 41*t* leading to the tank T is connected to the drain port d. Further, the first communication oil passage 34 from the boom first direction switching valve 31 is connected to the opening port f of the arm first direction switching valve 41, and a first opening tank oil passage 34*t* leading to the tank T is connected to the communication port e.

(Arm Second Direction Switching Valve 42)

The arm second direction switching valve 42 is configured to selectively switch a connection state of the pump port c and the drain port d with respect to the first input/output port a and the second input/output port b, and switch a connection state of the open port f with respect to the communication port e by an operation of the spool.

More specifically, when the arm operation lever 52 is in the neutral state, the pilot pressure does not act on left and right pressure chambers 42L and 42R, so that the arm second direction switching valve 42 is maintained at the neutral position illustrated in FIG. 1 by the springs g and h. In a state where the arm second direction switching valve 42 is disposed at the neutral position, the two input/output ports a and b, the pump port c, and the drain port d are blocked, respectively, and the communication port e is connected to the open port f.

When the pilot pressure acts on the pressure chamber 42L provided on the left side of the spool through an arm excavation second pilot oil passage 52*c* and an arm pressure reducing valve 62 by the excavating operation of the arm operation lever 52, the spool moves to the right side and is arranged at the excavating position illustrated in FIG. 5. In the arm second direction switching valve 42 disposed at the excavating position, the first input/output port a is connected to the drain port d, and the second input/output port b is connected to the pump port c. Note that in the arm second direction switching valve 42 disposed at the excavating position, the communication port e and the open port f are switched to a disconnected state.

On the other hand, when the pilot pressure acts on the pressure chamber 42R provided on the right side of the spool through an arm dump second pilot oil passage 52*d* by the dumping operation of the arm operation lever 52, the spool moves to the left side and moves to the dumping position illustrated in FIG. 6. In the arm second direction switching valve 42 disposed at the dumping position, the first input/output port a is connected to the pump port c, and the second input/output port b is connected to the drain port d. Note that in the arm second direction switching valve 42 disposed at the dumping position, the communication port e and the open port f are switched to a disconnected state.

As illustrated in FIG. 1, in the arm second direction switching valve 42, the arm second rod oil passage 14*b* is connected to the first input/output port a, and an arm second bottom oil passage 13*b* is connected to the second input/output port b. The arm second pump oil passage 24*b* is connected to the pump port c, and an arm second tank oil passage 42*t* leading to the tank T is connected to the drain port d. Further, the second communication oil passage 35 from the boom second direction switching valve 32 is connected to the opening port f of the arm second direction switching valve 42, and a second opening tank oil passage 35*t* leading to the tank T is connected to the communication port e.

As is clear from the drawing, the arm pressure reducing valve 62 is provided in the arm excavation second pilot oil passage 52*c* from the arm operation lever 52 to the pressure chamber 42L provided on the left side of the arm second direction switching valve 42. Similarly to the boom pressure reducing valve 61, the arm pressure reducing valve 62 blocks the pilot pressure from the arm excavation second pilot oil passage 52*c* to the pressure chamber 42L and connects the pressure chamber 42L to the tank when a control signal is not output from the controller 100 to be described later, and supplies the pilot pressure output from the arm operation lever 52 to the pressure chamber 42L when the control signal is output from the controller 100. The pilot pressure supplied to the pressure chamber 42L may be reduced by the arm pressure reducing valve 62.

(Controller 100)

The controller 100 illustrated in FIG. 1 monitors a pressure state of the arm hydraulic cylinder CA through a first pressure gauge P1 provided in the arm bottom oil passage 13 and a second pressure gauge P2 provided in the arm rod oil passage 14 when the work machine is in operation, and outputs a control signal to the arm pressure reducing valve 62 according to the pressure state of the arm hydraulic cylinder CA. At the same time, the controller 100 monitors a pressure state of the boom hydraulic cylinder CB through a third pressure gauge P3 provided in the boom bottom oil passage 11, and outputs a control signal to the boom pressure reducing valve 61 according to the pressure state of the boom hydraulic cylinder CB.

In the present embodiment, under a situation where the work machine is in operation, unless the force acting on the piston PA from the rod chamber a4 of the arm hydraulic cylinder CA is greater than or equal to the force acting on the piston PA from the bottom chamber a3, a control signal is set to be output from the controller 100 to the arm pressure reducing valve 62 at all times. That is, the controller 100 determines that the oil can flow through the arm regeneration passage 43 only in the pressure state in which the force acting on the piston PA from the rod chamber a4 is greater than or equal to the force acting on the piston PA from the bottom chamber a3, and operates to stop the output of the control signal to the arm pressure reducing valve 62 and output the control signal to the arm pressure reducing valve 62 in other pressure states. For example, a piston area of the bottom chamber a3 is A, a piston area of the rod chamber a4 is B, the force acting on the piston PA from the bottom chamber a3: $Fb=A\times Pb$ is calculated by the pressure of the bottom chamber a3: Pb detected by the first pressure gauge P1, the force acting on the piston PA from the rod chamber a4: $Fr=B\times Pr$ is calculated by the pressure of the rod chamber a4: Pr detected by the second pressure gauge P2, and the output of the control signal from the controller 100 to the arm pressure reducing valve 62 is stopped only when the relationship between the two forces satisfies $Fr\geq Fb$.

The boom hydraulic cylinder CB is set such that a control signal is always output from the controller 100 to the boom pressure reducing valve 61 except when the bottom chamber b3 is greater than or equal to a preset pressure threshold. That is, the controller 100 determines that oil can flow through the boom regeneration passage 33 only when the bottom chamber b3 becomes greater than or equal to the preset pressure threshold, and stops the output of the control signal to the boom pressure reducing valve 61. On the other hand, in other pressure states, the controller 100 operates to output the control signal to the boom pressure reducing valve 61 at all times.

(Neutral State)

In the hydraulic system described above, when both the boom operation lever 51 and the arm operation lever 52 are in neutral as illustrated in FIG. 1 after the operation of the work machine, all of the boom first direction switching valve 31, the boom second direction switching valve 32, the arm first direction switching valve 41, and the arm second direction switching valve 42 are disposed at the neutral positions. In this state, since the boom bottom oil passage 11, the boom rod oil passage 12, the arm bottom oil passage 13, and the arm rod oil passage 14 are blocked, oil is not circulated to the boom hydraulic cylinder CB and the arm hydraulic cylinder CA. Further, in this neutral state, since the arm hydraulic cylinder CA does not satisfy $Fr\geq Fb$, a control signal is output from the controller 100 to the arm pressure reducing valve 62, and the pilot pressure output from the arm operation lever 52 can be supplied to the pressure chamber 42L. Similarly, since the bottom chamber b3 of the boom hydraulic cylinder CB is not greater than or equal to the preset pressure threshold, a control signal is output from the controller 100 to the boom pressure reducing valve 61, and the pilot pressure output from the boom operation lever 51 can be supplied to the pressure chamber 32L.

(Arm Dumping)

When only the arm operation lever 52 is dumped from the neutral state, the arm first direction switching valve 41 and the arm second direction switching valve 42 are in the dumping positions as illustrated in FIG. 6. Therefore, oil discharged from the first hydraulic pump 21 is supplied to the rod chamber a4 of the arm hydraulic cylinder CA through the arm first pump oil passage 23*b* and the arm first rod oil passage 14*a*, and oil discharged from the second hydraulic pump 22 is supplied to the rod chamber a4 of the arm hydraulic cylinder CA through the arm second pump oil passage 24*b* and the arm second rod oil passage 14*b*. At the same time, oil discharged from the bottom chamber a3 of the arm hydraulic cylinder CA is discharged to the tank T through the arm first bottom oil passage 13*a* and the arm first tank oil passage 41*t*, and is discharged to the tank T through the arm second bottom oil passage 13*b* and the arm second tank oil passage 42*t*. Therefore, the arm hydraulic cylinder CA can perform arm dumping at a high operation speed. Note that at the time of the arm dumping, since the arm hydraulic cylinder CA satisfies $Fr\geq Fb$, the output of the control signal from the controller 100 to the arm pressure reducing valve 62 is stopped. However, since the pilot pressure is supplied from the arm operation lever 52 to the pressure chambers 41R and 42R provided on the right side of the spool, the above operation is not affected.

(Boom Raising)

When only the boom operation lever 51 is raised from the neutral state, the boom first direction switching valve 31 and the boom second direction switching valve 32 are at the raised positions as illustrated in FIG. 4. Therefore, oil discharged from the first hydraulic pump 21 is supplied to the bottom chamber b3 of the boom hydraulic cylinder CB through the boom first pump oil passage 23*a* and the boom first bottom oil passage 11*a*, and oil discharged from the second hydraulic pump 22 is supplied to the bottom chamber b3 of the boom hydraulic cylinder CB through the boom second pump oil passage 24*a* and the boom second bottom oil passage 11*b*. At the same time, the oil discharged from the rod chamber b4 of the boom hydraulic cylinder CB is discharged to the tank T through the boom second rod oil passage 12*b* and the boom second tank oil passage 32*t*. Therefore, since a large opening area is secured when the oil is returned to the tank T and the back pressure can be reduced, the boom hydraulic cylinder CB can be raised at a high operation speed. Note that at the time of raising the boom, there is a case where the bottom chamber b3 of the boom hydraulic cylinder CB becomes greater than or equal to a preset pressure threshold and the output of the control signal from the controller 100 to the boom pressure reducing valve 61 is stopped. However, since the pilot pressure is supplied from the boom operation lever 51 to the pressure chambers 31R and 32R provided on the right side of the spool, the above operation is not affected.

(Arm Excavating: Regeneration not Possible)

When only the arm operation lever 52 is operated for excavation from the neutral state, a pilot pressure is supplied from the arm operation lever 52 to each of the arm excavation first pilot oil passage 52*a* and the arm excavation second pilot oil passage 52*c*. Here, in a state where the force acting on the piston PA from the rod chamber a4 of the arm hydraulic cylinder CA is less than or equal to the force acting on the piston PA from the bottom chamber a3, for example, in a state where the excavating operation is performed by a bucket 7 provided at the distal end part of the arm 4, Fr<Fb is satisfied. Therefore, the controller 100 determines that the oil cannot flow through the arm regeneration passage 43, and remains in a state where the control signal is output to the arm pressure reducing valve 62. Therefore, under this condition, as illustrated in FIG. 5, the pilot pressure from the arm operation lever 52 acts on both the pressure chamber 41L located on the left side of the arm first direction switching valve 41 and the pressure chamber 42L located on the left side of the arm second direction switching valve 42, and each spool is disposed at the excavating position. As a result, oil discharged from the first hydraulic pump 21 is supplied to the bottom chamber a3 of the arm hydraulic cylinder CA through the arm first pump oil passage 23*b* and the arm first bottom oil passage 13*a*, and oil discharged from the second hydraulic pump 22 is supplied to the bottom chamber a3 of the arm hydraulic cylinder CA through the arm second pump oil passage 24*b* and the arm second bottom oil passage 13*b*. At the same time, oil discharged from the rod chamber a4 of the arm hydraulic cylinder CA is discharged to the tank T through the arm first rod oil passage 14*a* and the arm first tank oil passage 41*t*, and is discharged to the tank T through the arm second rod oil passage 14*b* and the arm second tank oil passage 42*t*. Therefore, since a large opening area is secured when the oil is returned to the tank T and the back pressure can be reduced, the arm hydraulic cylinder CA can be subjected to the arm excavation at a high operation speed. Note that, in the above state, the oil does not flow through the arm regeneration passage 43 of the arm first direction switching valve 41 by the action of the check valve 43*b*.

(Arm Excavating: Regeneration Possible)

Figure 7:
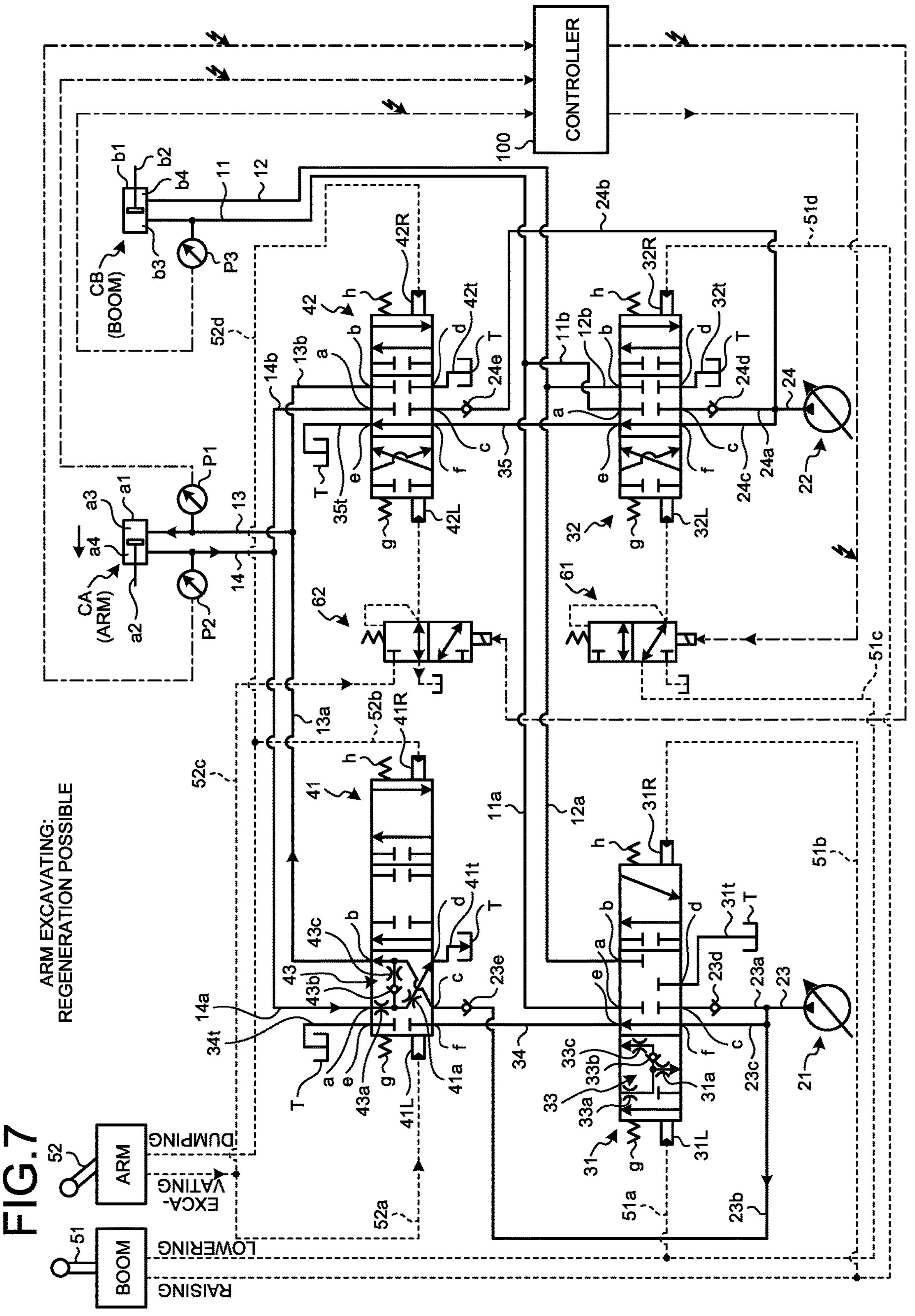
FIG. 7 is a diagram illustrating a state in which, by control of a controller, the arm second direction switching valve is maintained at a neutral position and only the arm first direction switching valve is disposed at an excavating position in the hydraulic system illustrated in FIG. 1.

On the other hand, in a state where the force acting on the piston PA from the rod chamber a4 of the arm hydraulic cylinder CA exceeds the force acting on the piston PA from the bottom chamber a3 when only the arm operation lever 52 is excavated, for example, in an operation of freely dropping the distal end part of the arm 4 disposed along the horizontal downward, Fr>Fb is satisfied. Therefore, the controller 100 determines that the oil can flow through the arm regeneration passage 43, and stops the output of the control signal to the arm pressure reducing valve 62. Therefore, under this condition, as illustrated in FIG. 7, the pilot pressure acts on the pressure chamber 41L located on the left side of the arm first direction switching valve 41, but the pilot pressure does not act on the pressure chamber 42L located on the left side of the arm second direction switching valve 42. That is, in the above state, only the spool of the arm first direction switching valve 41 is disposed at the excavating position, and the spool of the arm second direction switching valve 42 is maintained at the neutral position. Further, in the arm first direction switching valve 41, the check valve 43*b* of the arm regeneration passage 43 is opened, and oil can pass from the first input/output port a to the second input/output port b via the first throttle 43*a*, the check valve 43*b*, and the third throttle 43*c*. As a result, the oil discharged from the first hydraulic pump 21 is supplied to the bottom chamber a3 of the arm hydraulic cylinder CA through the arm first pump oil passage 23*b* and the arm first bottom oil passage 13*a*. At the same time, the oil discharged from the rod chamber a4 of the arm hydraulic cylinder CA is discharged to the tank T through the arm first rod oil passage 14*a* and the arm first tank oil passage 41*t*, and a part of the oil from the arm first rod oil passage 14*a* is regenerated to the bottom chamber a3 of the arm hydraulic cylinder CA through the arm regeneration passage 43 and the arm first bottom oil passage 13*a*. Therefore, the flow rate of the oil supplied from the first hydraulic pump 21 to the bottom chamber a3 can be reduced by the flow rate of the oil regenerated through the arm regeneration passage 43. That is, in the above-described state, since the discharge flow rate from the first hydraulic pump 21 can be reduced and the discharge flow rate from the second hydraulic pump 22 can be reduced to 0, there is an advantage that the fuel consumption of the first hydraulic pump 21 and the second hydraulic pump 22 can be improved. Moreover, since there is no flow of oil between the arm second direction switching valve 42 and the arm hydraulic cylinder CA, the flow rates of the oil discharged to the tank T and the oil regenerated in the bottom chamber a3 of the arm hydraulic cylinder CA are always constant by the second throttle 41*a* and the third throttle 43*c* of the arm first direction switching valve 41. Therefore, it is not necessary to consider variations due to the combination of the arm first direction switching valve 41 and the arm second direction switching valve 42, and not only manufacturing work and assembly work can be facilitated, but also the arm 4 can be easily and arbitrarily controlled according to the operation of the arm operation lever 52.

(Arm Excavating: Regeneration Possible+Boom Raising)

Figure 8:
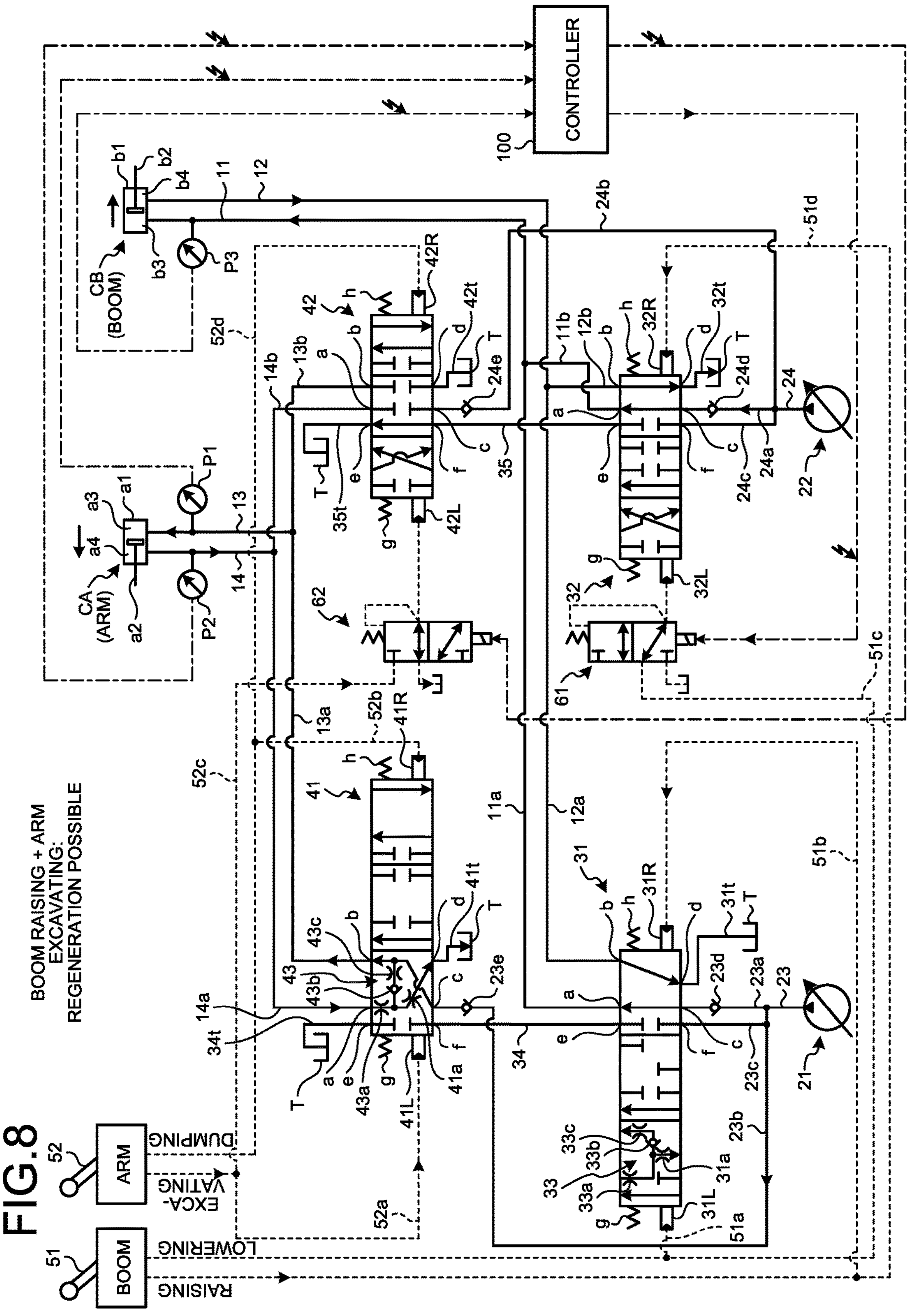
FIG. 8 is a diagram illustrating a state in which the boom first direction switching valve and the boom second direction switching valve are disposed at raised positions from the state illustrated in FIG. 7.

Furthermore, at the time of the arm excavation, when the boom operation lever 51 is raised to perform a so-called plowing operation, as illustrated in FIG. 8, the boom direction switching valves 31 and 32 are at the raised positions, and oil can be supplied from the two hydraulic pumps 21 and 22 to the bottom chamber b3 of the boom hydraulic cylinder CB. However, in the boom hydraulic cylinder CB and the arm hydraulic cylinder CA, since the pressure of the boom hydraulic cylinder CB is high and the check valve 23*d* is interposed in the boom first pump oil passage 23*a*, the oil discharged from the first hydraulic pump 21 is supplied to the bottom chamber a3 of the arm hydraulic cylinder CA and is not supplied to the bottom chamber b3 of the boom hydraulic cylinder CB through the boom first direction switching valve 31. That is, the oil discharged from the first hydraulic pump 21 is supplied to the bottom chamber a3 of the arm hydraulic cylinder CA, and the oil discharged from the second hydraulic pump 22 is supplied to the bottom chamber b3 of the boom hydraulic cylinder CB. As a result, oil having a relatively low pressure required for arm excavation may be supplied from the first hydraulic pump 21, and oil having a relatively high pressure required for boom raising may be supplied from the second hydraulic pump 22. Therefore, since it is not necessary to drive the first hydraulic pump 21 in accordance with the high pressure of the second hydraulic pump 22, there is no possibility of causing a pressure loss of the first hydraulic pump 21.

(Boom Lowering: Regeneration not Possible)

When only the boom operation lever 51 is operated to be lowered from the neutral state, a pilot pressure is supplied from the boom operation lever 51 to each of the boom lowering first pilot oil passage 51*a* and the boom lowering second pilot oil passage 51*c*. Here, in a state where the bottom chamber b3 of the boom hydraulic cylinder CB is less than or equal to the pressure threshold, for example, in a state where the bucket 7 provided at the distal end part of the boom 3 presses the ground to float the lower travelling body 1, a larger pressure is required in the rod chamber b4 than in the bottom chamber b3. Therefore, the controller 100 determines that the oil cannot flow through the boom regeneration passage 33, and the control signal remains output to the boom pressure reducing valve 61. Therefore, under this condition, as illustrated in FIG. 3, the pilot pressure from the boom operation lever 51 acts on both the pressure chamber 31L located on the left side of the boom first direction switching valve 31 and the pressure chamber 32L located on the left side of the boom second direction switching valve 32, and each spool is disposed at the lowered position. As a result, the oil discharged from the second hydraulic pump 22 is supplied to the rod chamber b4 of the boom hydraulic cylinder CB through the boom second pump oil passage 24*a* and the boom second rod oil passage 12*b*. At the same time, the oil discharged from the bottom chamber b3 of the boom hydraulic cylinder CB is discharged to the tank T through the boom first bottom oil passage 11*a* and the boom first tank oil passage 31*t*, and is discharged to the tank T through the boom second bottom oil passage 11*b* and the boom second tank oil passage 32*t*. Therefore, since a large opening area is secured when the oil is returned to the tank T and the back pressure can be lowered, the boom hydraulic cylinder CB can be lowered at a high operation speed. Note that in the above state, the oil does not flow through the boom regeneration passage 33 of the boom first direction switching valve 31 by the action of the check valve 33*b*.

(Boom Lowering: Regeneration Possible)

Figure 9:
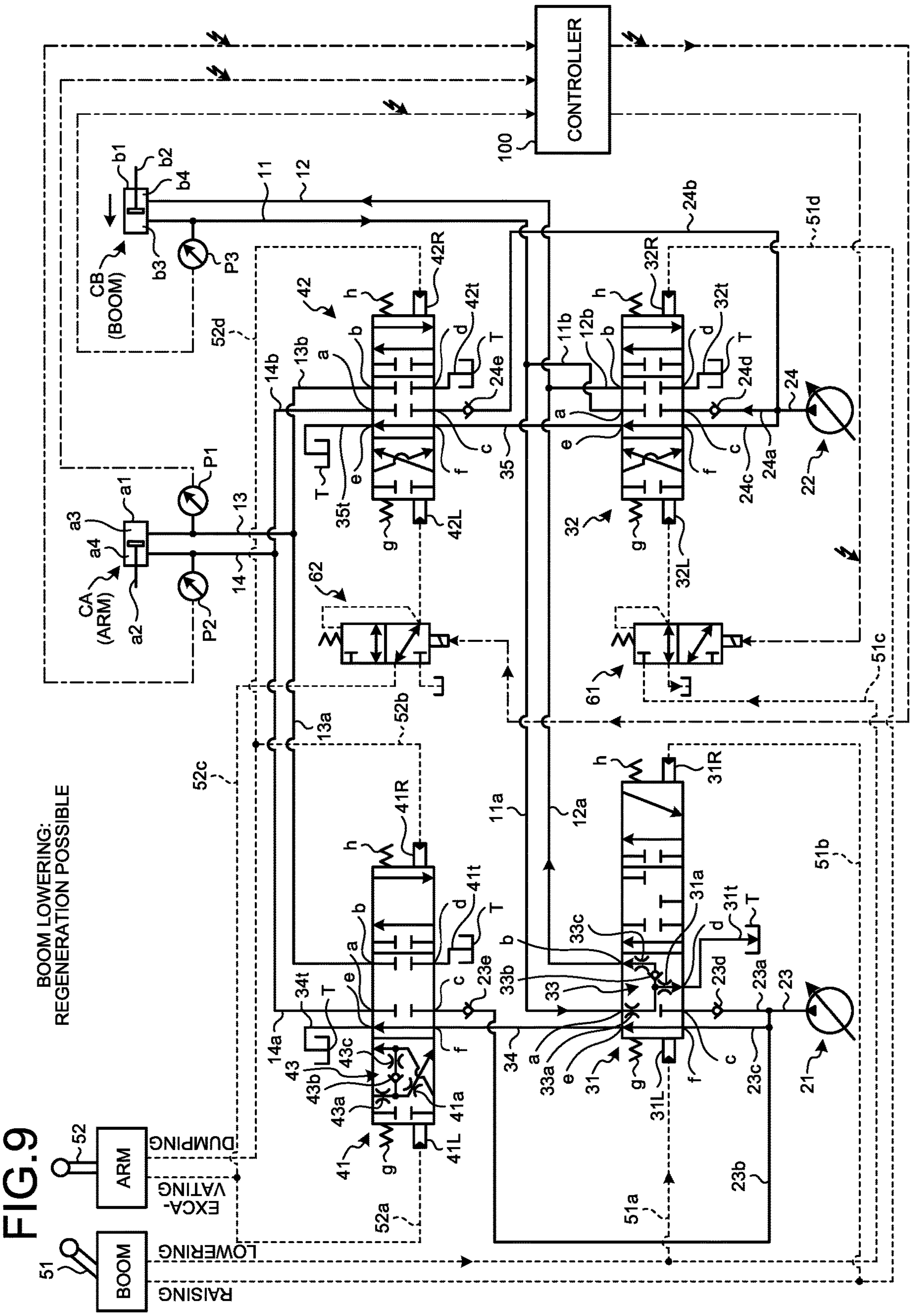
FIG. 9 is a diagram illustrating a state in which, by control of the controller, the boom second direction switching valve is maintained at a neutral position and only the boom first direction switching valve is disposed at a lowered position in the hydraulic system illustrated in FIG. 1.

On the other hand, in a state in which the bottom chamber b3 of the boom hydraulic cylinder CB exceeds the pressure threshold when only the boom operation lever 51 is operated to be lowered, for example, in an operation in which the distal end part of the boom 3 arranged at the raised position is freely dropped downward, the pressure of the bottom chamber b3 increases due to the weight of the boom 3. Therefore, the controller 100 determines that the oil can flow through the boom regeneration passage 33, and stops the output of the control signal to the boom pressure reducing valve 61. Therefore, under this condition, as illustrated in FIG. 9, the pilot pressure acts on the pressure chamber 31L located on the left side of the boom first direction switching valve 31, but the pilot pressure does not act on the pressure chamber 32L located on the left side of the boom second direction switching valve 32. That is, in the above state, only the spool of the boom first direction switching valve 31 is disposed at the lowered position, and the spool of the boom second direction switching valve 32 is maintained at the neutral position. Further, in the boom first direction switching valve 31, the check valve 33*b* of the boom regeneration passage 33 is opened, and oil can pass from the first input/output port a to the second input/output port b via the first throttle 33*a*, the check valve 33*b*, and the third throttle 33*c*. As a result, the oil discharged from the bottom chamber b3 of the boom hydraulic cylinder CB is discharged to the tank T through the boom first bottom oil passage 11*a* and the boom first tank oil passage 31*t*, and a part of the oil from the boom first bottom oil passage 11*a* is regenerated to the rod chamber b4 of the boom hydraulic cylinder CB through the boom regeneration passage 33 and the boom first rod oil passage 12*a*. Therefore, there is an advantage that the boom can be lowered without supplying oil from the first hydraulic pump 21 and the second hydraulic pump 22 to the rod chamber b4, and the fuel consumption of the first hydraulic pump 21 and the second hydraulic pump 22 can be improved. Moreover, since there is no flow of oil between the boom second direction switching valve 32 and the boom hydraulic cylinder CB, the flow rates of the oil discharged to the tank T and the oil regenerated in the rod chamber b4 of the boom hydraulic cylinder CB are always constant by the second throttle 31*a* and the third throttle 33*c* of the boom first direction switching valve 31. Therefore, it is not necessary to consider variations due to the combination of the boom first direction switching valve 31 and the boom second direction switching valve 32, and not only the manufacturing operation and the assembly operation can be facilitated, but also the boom 3 can be easily and arbitrarily controlled according to the operation of the boom operation lever 51.

(Boom Lowering: Regeneration Possible+Arm Dumping)

Figure 10:
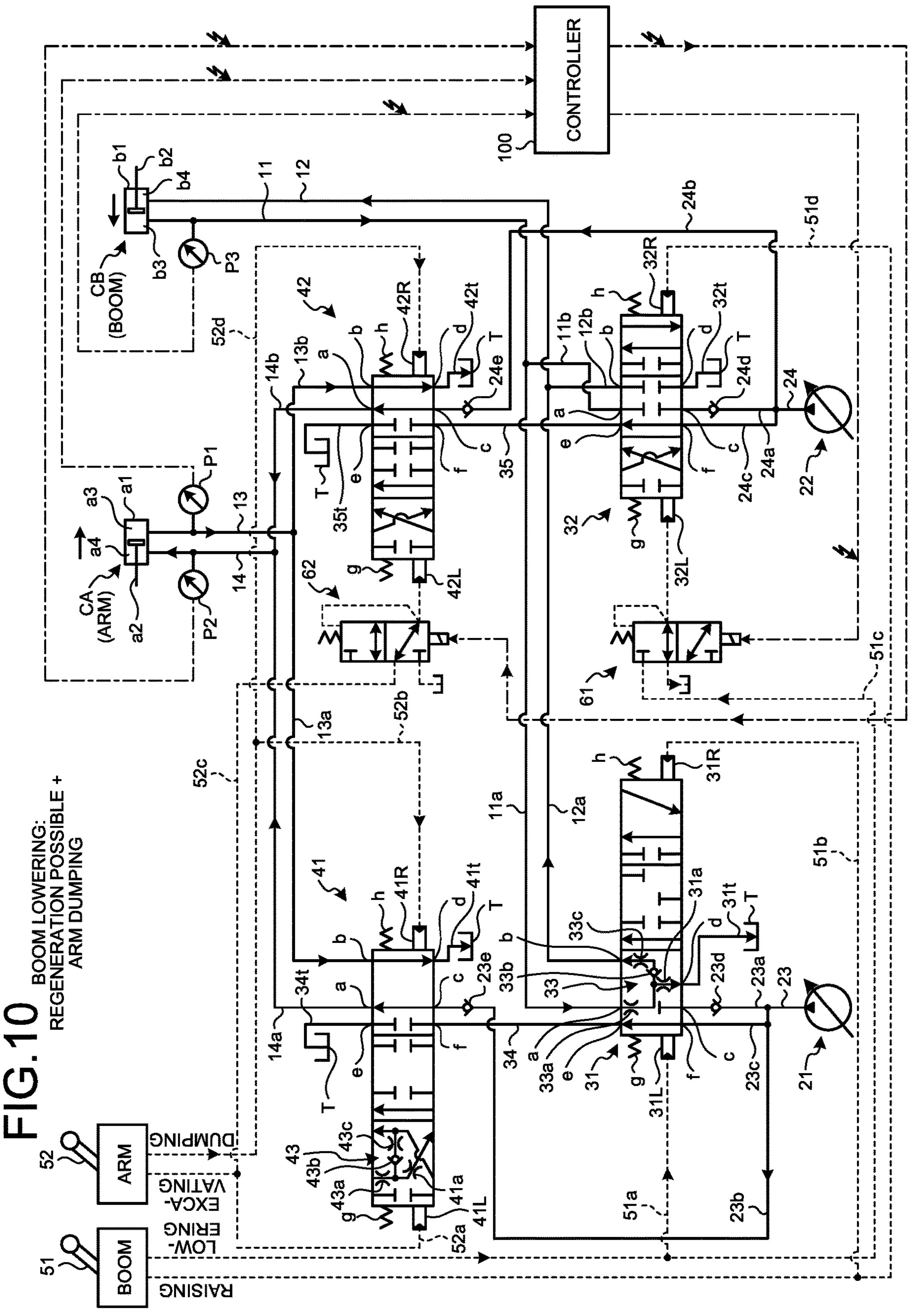
FIG. 10 is a diagram illustrating a state in which the arm first direction switching valve and the arm second direction switching valve are disposed at dumping positions from the state illustrated in FIG. 9.

Furthermore, at the time of lowering the boom, when the arm operation lever 52 is dumped so as to perform a so-called reverse plowing operation, as illustrated in FIG. 10, the arm direction switching valves 41 and 42 are in the dumping positions, and oil is supplied from both of the two hydraulic pumps 21 and 22 to the rod chamber a4 of the arm hydraulic cylinder CA, so that the retracting operation of the boom hydraulic cylinder CB does not affect the retracting operation of the arm hydraulic cylinder CA. Therefore, since a large opening area is secured when the oil is returned to the tank T, and the back pressure can be reduced, the arm hydraulic cylinder CA can be subjected to an arm dump at a high operation speed, and the reverse plowing operation work can be performed at a high speed.

In the embodiment described above, the operation of the boom second direction switching valve 32 is controlled by determining whether or not the oil flow through the boom regeneration passage 33 of the boom first direction switching valve 31 is possible also for the boom hydraulic cylinder CB. However, the above-described control is not necessarily performed for the boom hydraulic cylinder CB. Further, when the force acting on the piston PA from the rod chamber a4 of the arm hydraulic cylinder CA is equal to or less than the force acting on the piston PA from the bottom chamber a3, it is determined that the oil cannot flow through the arm regeneration passage 43, but the present disclosure is not necessarily limited thereto.

Further, in the embodiment described above, the pilot pressure from the operation levers 51 and 52 is supplied to the direction switching valves 32 and 42 via the pressure reducing valves 61 and 62. However, oil from another hydraulic source such as a pilot pump may be supplied. Furthermore, the pressure reducing valves 61 and 62 are operated depending on whether the pilot pressure is supplied or stopped, but the present disclosure is not limited thereto. For example, the pressure reducing valve can be configured to be operated depending on whether or not a current value output from the controller exceeds a threshold. Note that in the embodiment described above, the pilot pressure is supplied to the direction switching valves 32 and 42 when the control signal is output from the controller 100. However, the pilot pressure may not be supplied to the direction switching valves 32 and 42 when the control signal is output from the controller 100. Further, although the pilot pressure from the operation lever is output by way of example, an electromagnetic proportional pressure reducing valve may be applied.

Furthermore, in the above-described embodiment, when the work machine is in the operating state, the controller 100 constantly outputs a control signal to the pressure reducing valves 61 and 62 to set the pilot pressure from the operation levers 51 and 52 to be supplied to the direction switching valves 32 and 42, and only when it is determined that the oil can pass through the boom regeneration passage 33 and the arm regeneration passage 43, the output of the control signal from the controller 100 to the pressure reducing valves 61 and 62 is stopped to prevent the pilot pressure from the operation levers 51 and 52 from being supplied to the direction switching valves 32 and 42 (interrupt oil flow between the hydraulic cylinders CB and CA, and the direction switching valves 32 and 42). However, the present embodiment is not necessarily limited thereto, and for example, may be configured as a modification example illustrated in FIG. 11 below.

Modification Example

Figure 11:
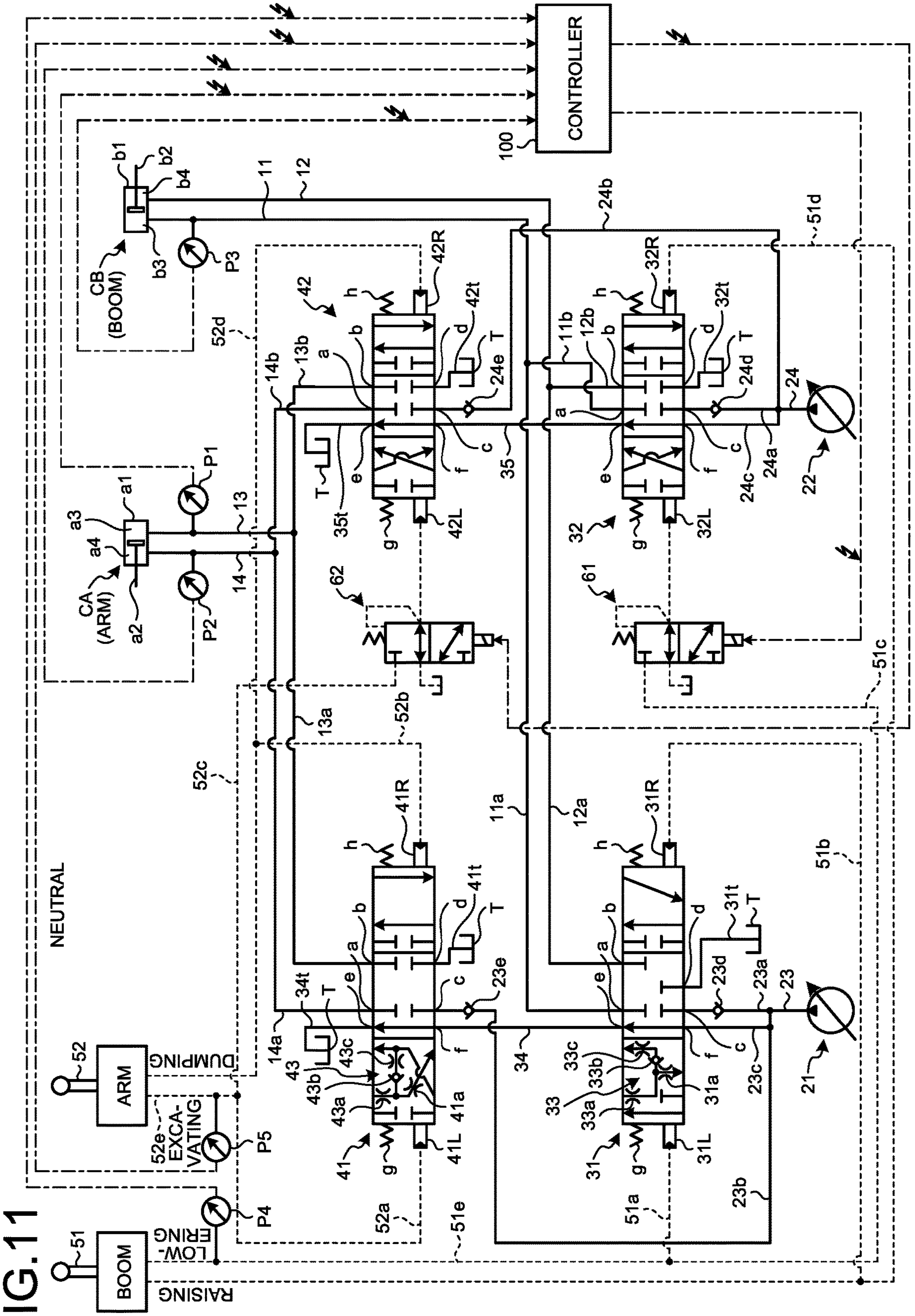
FIG. 11 is a diagram illustrating a modification example of the hydraulic system according to the present embodiment.

FIG. 11 illustrates a modification example of the hydraulic system according to the present embodiment. Similarly to the above-described embodiment, this modification example is for operating the boom hydraulic cylinder CB and the arm hydraulic cylinder CA of the work machine illustrated in FIG. 2, and is different from the embodiment in that pressure gauges P4 and P5 are added to the boom operation lever 51 and the arm operation lever 52, respectively, and the pressures detected by the pressure gauges P4 and P5 are input to the controller 100, and the control content of the controller 100.

More specifically, the boom operation lever 51 is provided with the fourth pressure gauge P4 in a boom lowering pilot oil passage 51*e* that outputs the pilot pressure in the case of the lowering operation, and the arm operation lever 52 is provided with the fifth pressure gauge P5 in an arm excavation pilot oil passage 52*e* that outputs the pilot pressure in the case of the excavating operation. The boom lowering pilot oil passage 51*e* provided with the fourth pressure gauge P4 is an oil passage before branching into the boom lowering first pilot oil passage 51*a* and the boom lowering second pilot oil passage 51*c*, and the arm excavation pilot oil passage 52*e* provided with the fifth pressure gauge P5 is an oil passage before branching into the arm excavation first pilot oil passage 52*a* and the arm excavation second pilot oil passage 52*c*.

According to the hydraulic system of the modification example configured as described above, it is possible to detect whether or not the boom operation lever 51 is operated to be lowered by the controller 100 from the pressure value provided through the fourth pressure gauge P4. Similarly, it is possible to detect whether or not the arm operation lever 52 is excavated by the controller 100 from the pressure value provided through the fifth pressure gauge P5. Therefore, in this hydraulic system, as illustrated in FIG. 11, when both the boom operation lever 51 and the arm operation lever 52 are in neutral after the operation of the work machine, the controller 100 can stop the output of the control signals to both the pressure reducing valves 61 and 62. That is, if the controller 100 outputs the control signal to the pressure reducing valves 61 and 62 only when it is determined that oil cannot pass through the boom regeneration passage 33 and the arm regeneration passage 43, the direction switching valves 32 and 42 can be operated similarly to the embodiment. Thus, according to this modification example, since the control signal is not output to the pressure reducing valves 61 and 62 other than when necessary, it is advantageous not only in terms of power consumption but also in terms of the operation life of the pressure reducing valves 61 and 62 since the time for maintaining the pressure reducing valve in the operating state against the return spring is reduced.

REFERENCE SIGNS LIST

2 UPPER SWING BODY
3 BOOM
4 ARM
11*a* BOOM FIRST BOTTOM OIL PASSAGE
11*b* BOOM SECOND BOTTOM OIL PASSAGE
12*a* BOOM FIRST ROD OIL PASSAGE
12*b* BOOM SECOND ROD OIL PASSAGE
13*a* ARM FIRST BOTTOM OIL PASSAGE
13*b* ARM SECOND BOTTOM OIL PASSAGE
14*a* ARM FIRST ROD OIL PASSAGE
14*b* ARM SECOND ROD OIL PASSAGE
21 FIRST HYDRAULIC PUMP
22 SECOND HYDRAULIC PUMP
23*b* ARM FIRST PUMP OIL PASSAGE
24*a* BOOM SECOND PUMP OIL PASSAGE
24*b* ARM SECOND PUMP OIL PASSAGE
31 BOOM FIRST DIRECTION SWITCHING VALVE
31*t* BOOM FIRST TANK OIL PASSAGE
32 BOOM SECOND DIRECTION SWITCHING VALVE
32*t* BOOM SECOND TANK OIL PASSAGE
33 BOOM REGENERATION PASSAGE
41 ARM FIRST DIRECTION SWITCHING VALVE
41*t* ARM FIRST TANK OIL PASSAGE
42 ARM SECOND DIRECTION SWITCHING VALVE
42*t* ARM SECOND TANK OIL PASSAGE
43 ARM REGENERATION PASSAGE
51 BOOM OPERATION LEVER
51*a* BOOM LOWERING FIRST PILOT OIL PASSAGE
51*c* BOOM LOWERING SECOND PILOT OIL PASSAGE
52 ARM OPERATION LEVER
52*a* ARM EXCAVATION FIRST PILOT OIL PASSAGE
52*c* ARM EXCAVATION SECOND PILOT OIL PASSAGE
61 BOOM PRESSURE REDUCING VALVE
62 ARM PRESSURE REDUCING VALVE
100 CONTROLLER
CA ARM HYDRAULIC CYLINDER
a1 CYLINDER BODY
a2 ROD
a3 BOTTOM CHAMBER
a4 ROD CHAMBER
CB BOOM HYDRAULIC CYLINDER
b1 CYLINDER BODY
b2 ROD
b3 BOTTOM CHAMBER
b4 ROD CHAMBER
PA PISTON
T TANK

The invention claimed is:

1. A hydraulic system comprising:

an arm hydraulic cylinder supported by a boom of a work machine via a cylinder body, and supported by an arm of the work machine via a rod;

a first hydraulic pump and a second hydraulic pump;

an arm first direction switching valve interposed between the first hydraulic pump and the arm hydraulic cylinder;

an arm second direction switching valve interposed between the second hydraulic pump and the arm hydraulic cylinder; and a controller that controls an operation of the arm second direction switching valve when the arm hydraulic cylinder is extended and operated, wherein the arm first direction switching valve incorporates an arm regeneration passage capable of supplying oil discharged from a rod chamber of the arm hydraulic cylinder to a bottom chamber of the arm hydraulic cylinder when the arm hydraulic cylinder is extended and operated, and the controller monitors a pressure state of the arm hydraulic cylinder, and when determining that oil flow through the arm regeneration passage is possible, the controller blocks oil flow between the arm hydraulic cylinder and the arm second direction switching valve, and when determining that oil flow through the arm regeneration passage is not possible, the controller operates the arm second direction switching valve so that oil can be supplied from the second hydraulic pump to the bottom chamber.

2. The hydraulic system according to claim 1, further comprising:

an arm first bottom oil passage connecting the bottom chamber and the arm first direction switching valve;

an arm second bottom oil passage connecting the bottom chamber and the arm second direction switching valve;

an arm first rod oil passage connecting the rod chamber and the arm first direction switching valve;

an arm second rod oil passage connecting the rod chamber and the arm second direction switching valve;

an arm first pump oil passage connecting the first hydraulic pump and the arm first direction switching valve;

an arm second pump oil passage connecting the second hydraulic pump and the arm second direction switching valve;

an arm first tank oil passage connecting a tank and the arm first direction switching valve; and an arm second tank oil passage connecting the tank and the arm second direction switching valve, wherein when the arm first rod oil passage is connected to the arm first tank oil passage, the arm first direction switching valve connects the arm first pump oil passage to the arm first bottom oil passage, and enables oil to be supplied from the arm first rod oil passage to the arm first bottom oil passage through the arm regeneration passage, and the controller operates the arm second direction switching valve such that the arm second bottom oil passage and the arm second rod oil passage are blocked, respectively, when determining that oil flow through the arm regeneration passage is possible, and operates the arm second direction switching valve such that the arm second bottom oil passage is connected to the arm second pump oil passage and the arm second rod oil passage is connected to the arm second tank oil passage when determining that oil flow through the arm regeneration passage is not possible.

3. The hydraulic system according to claim 2, wherein the controller blocks the arm second bottom oil passage and the arm second rod oil passage when a force acting on a piston from the rod chamber exceeds a force acting on the piston from the bottom chamber, and connects the arm second bottom oil passage to the arm second pump oil passage and connects the arm second rod oil passage to the arm second tank oil passage when the force acting on the piston from the rod chamber becomes less than or equal to the force acting on the piston from the bottom chamber.

4. The hydraulic system according to claim 3, further comprising:

an arm excavation first pilot oil passage that applies a pilot pressure to one end part of the arm first direction switching valve when an arm operation lever is subjected to an excavating operation to extend and operate the arm hydraulic cylinder;

an arm excavation second pilot oil passage that applies a pilot pressure to one end part of the arm second direction switching valve when the arm operation lever is subjected to the excavating operation; and an arm pressure reducing valve interposed in the arm excavation second pilot oil passage, wherein the arm second direction switching valve blocks the arm second bottom oil passage and the arm second rod oil passage, respectively, when being disposed at a neutral position, and the controller decompresses the arm excavation second pilot oil passage by the arm pressure reducing valve when the force acting on the piston from the rod chamber exceeds the force acting on the piston from the bottom chamber.

5. The hydraulic system according to claim 1, further comprising:

a boom hydraulic cylinder supported by a base of the work machine via a cylinder body, and supported by the boom via a rod;

a boom first direction switching valve interposed between the first hydraulic pump and the boom hydraulic cylinder;

a boom second direction switching valve interposed between the second hydraulic pump and the boom hydraulic cylinder; and a controller that controls an operation of the boom second direction switching valve when the boom hydraulic cylinder is retracted and operated, wherein the boom first direction switching valve incorporates a boom regeneration passage capable of supplying oil discharged from a bottom chamber of the boom hydraulic cylinder to the rod chamber of the boom hydraulic cylinder when the boom hydraulic cylinder is retracted and operated, and the controller monitors a pressure state of the boom hydraulic cylinder, and when determining that oil flow through the boom regeneration passage is possible, the controller blocks oil flow between the boom hydraulic cylinder and the boom second direction switching valve, and when determining that oil flow through the boom regeneration passage is not possible, the controller operates the boom second direction switching valve so that oil can be supplied from the second hydraulic pump to the rod chamber of the boom hydraulic cylinder.

6. The hydraulic system according to claim 5, further comprising:

a boom first bottom oil passage connecting the bottom chamber of the boom hydraulic cylinder and the boom first direction switching valve;

a boom second bottom oil passage connecting the bottom chamber of the boom hydraulic cylinder and the boom second direction switching valve;

a boom first rod oil passage connecting the rod chamber of the boom hydraulic cylinder and the boom first direction switching valve;

a boom second rod oil passage connecting the rod chamber of the boom hydraulic cylinder and the boom second direction switching valve;

a boom second pump oil passage connecting the second hydraulic pump and the boom second direction switching valve;

a boom first tank oil passage connecting the tank and the boom first direction switching valve; and a boom second tank oil passage connecting the tank and the boom second direction switching valve, wherein when the boom first bottom oil passage is connected to the boom first tank oil passage, the boom first direction switching valve enables oil to be supplied from the boom first bottom oil passage to the boom first rod oil passage through the boom regeneration passage, and the controller operates the boom second direction switching valve such that the boom second bottom oil passage and the boom second rod oil passage are blocked, respectively, when determining that oil flow through the boom regeneration passage is possible, and operates the boom second direction switching valve such that the boom second rod oil passage is connected to the boom second pump oil passage and the boom second bottom oil passage is connected to the boom second tank oil passage when determining that oil flow through the boom regeneration passage is not possible.

7. The hydraulic system according to claim 6, wherein the controller blocks the boom second bottom oil passage and the boom second rod oil passage when a pressure of the bottom chamber of the boom hydraulic cylinder exceeds a preset pressure threshold, and connects the boom second rod oil passage to the boom second pump oil passage and connects the boom second bottom oil passage to the boom second tank oil passage when the pressure of the bottom chamber of the boom hydraulic cylinder becomes less than or equal to the pressure threshold.

8. The hydraulic system according to claim 7, further comprising:

a boom lowering first pilot oil passage that applies a pilot pressure to one end part of the boom first direction switching valve when a boom operation lever is subjected to a lowering operation to retract and operate the boom hydraulic cylinder;

a boom lowering second pilot oil passage that applies a pilot pressure to one end part of the boom second direction switching valve when the boom operation lever is subjected to the lowering operation; and a boom pressure reducing valve interposed in the boom lowering second pilot oil passage, wherein the boom second direction switching valve blocks the boom second bottom oil passage and the boom second rod oil passage, respectively, when being disposed at a neutral position, and the controller decompresses the boom lowering second pilot oil passage by the boom pressure reducing valve when the pressure of the bottom chamber of the boom hydraulic cylinder exceeds the preset pressure threshold.

* * * * *